No. 886,761. PATENTED MAY 5, 1908.
J. R. CARDWELL.
CAR CONSTRUCTION.
APPLICATION FILED JULY 5, 1906.
2 SHEETS—SHEET 1.
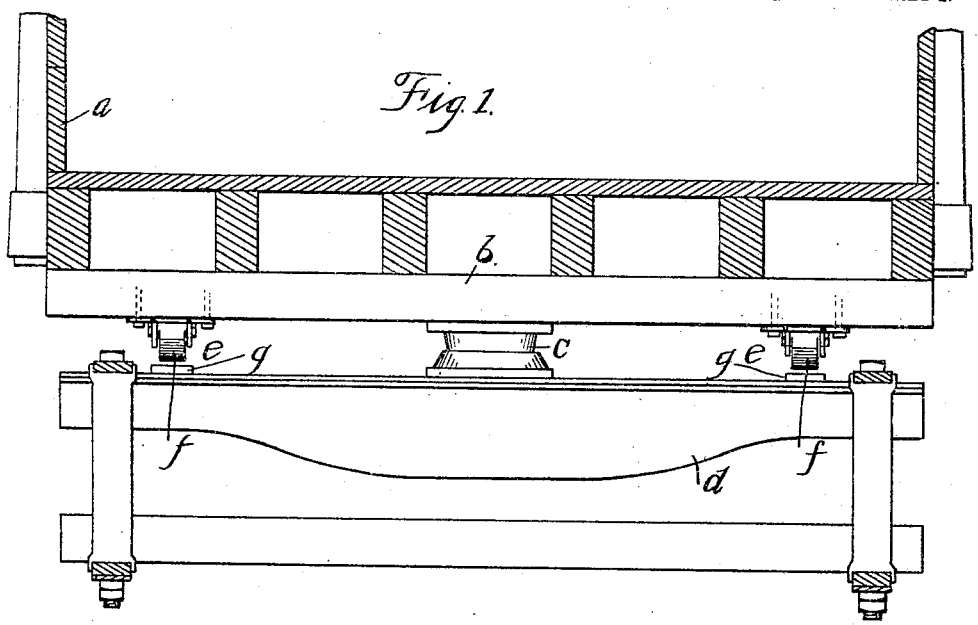
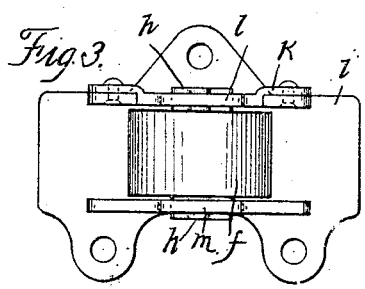
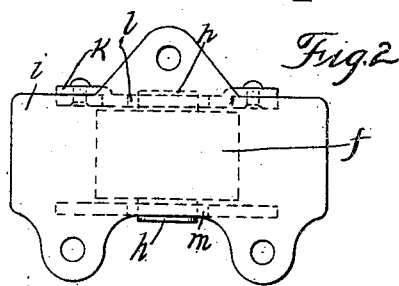
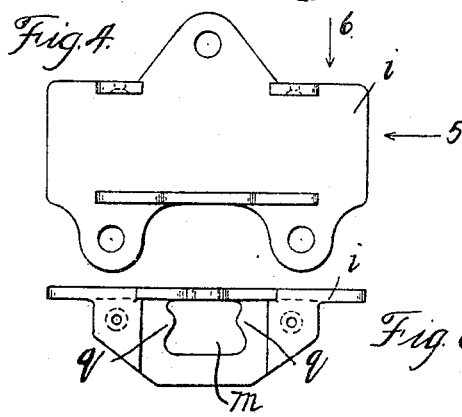
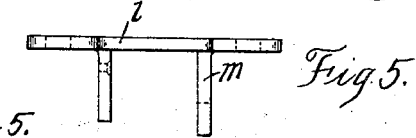
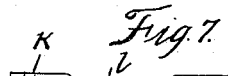
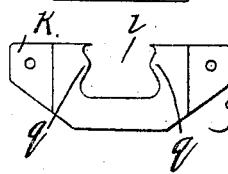
Witnesses.
Webb G. Krauser.
Chas. G. Ashley
Inventor:
James R. Cardwell
By G. L. Cragg
Attorney.

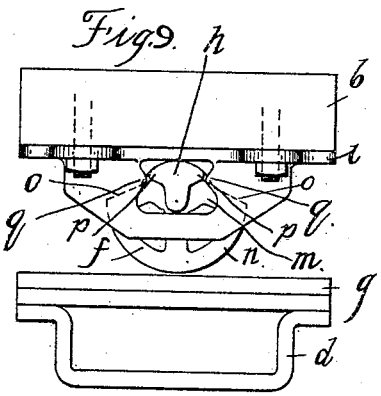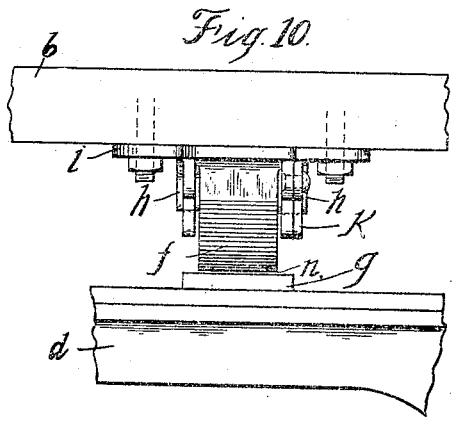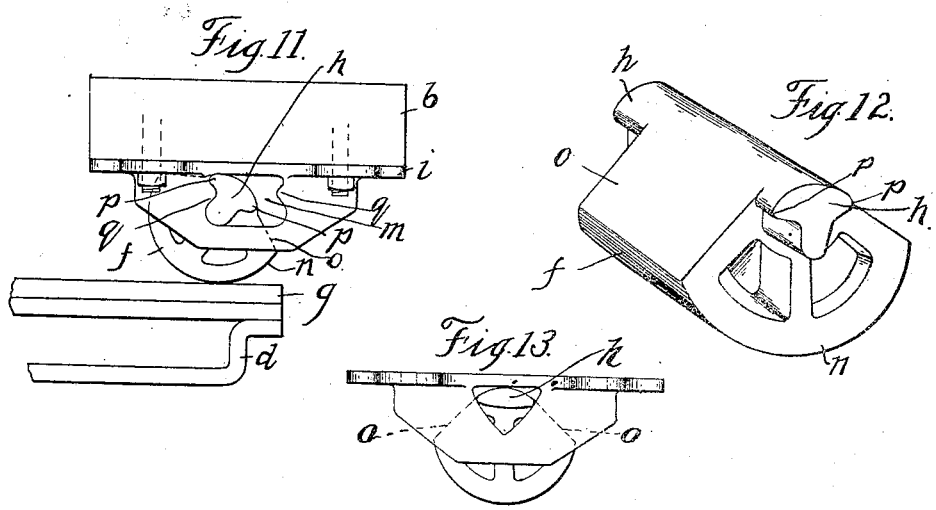

UNITED STATES PATENT OFFICE.

JAMES R. CARDWELL, OF CHICAGO, ILLINOIS.

CAR CONSTRUCTION.

No. 886,761.        Specification of Letters Patent.        Patented May 5, 1908.

Application filed July 5, 1906. Serial No. 324,827.

*To all whom it may concern:*

Be it known that I, JAMES R. CARDWELL, citizen of the United States, residing at Chicago, in the county of Cook and State of Illinois, have invented a certain new and useful Improvement in Car Construction, of which the following is a full, clear, concise, and exact description, reference being had to the accompanying drawings, forming a part of this specification.

My invention relates to car construction in which side bearings are employed, and the preferred embodiment thereof is an improvement upon the construction forming the subject matter of my application Serial No. 307,876, filed March 24, 1906.

In the device of my said co-pending application, there is disclosed the combination of a car body with rockers carried thereby and adapted to engage with some portions of the trucks supporting the car body. In the construction of said application, the rockers are swingingly mounted upon the car body bolsters near their outer ends, the said rockers serving to engage the top faces of the truck bolsters with which the body bolsters have pivotal connection. The shafts of the rockers are not only so mounted beneath the body bolsters as to permit the rocking action of the rockers, but said shafts are so mounted that they may travel bodily to a limited extent, whereby the rockers may by a simple construction be permitted to assume normal central positions with respect to their mountings, when relieved of engagement with the truck bolsters. In order that this normal central position on the part of each rocker may be assured, means are provided supplementing the natural action of the rocker for forcing this return to normal, this means residing in a lug or tooth provided upon a peripheral portion of the rocker shaft and projecting into a slot located above the rocker shaft, the parallel ends of the slot affording fulcra, about either of which the rocker is moved by the force of its own weight when relieved of engagement with the corresponding truck bolster.

In the device of the aforesaid application, the vertical height of the openings through which the shaft projects is slightly larger than the diameter of the shaft, and the periphery of the shaft is concentric throughout with the axis of rotation of the shaft, though it should be understood that while a specific construction of the said application is herein outlined, the invention disclosed in said application is generic and is not limited to the particular embodiment specifically set forth.

By means of my present invention, I am enabled to secure a greater range of travel of the car body upon the upper portions of the rockers in proportion to the vertical dimensions of the openings through which the shafts project than the corresponding travel afforded by the specific construction outlined in my said co-pending application. I accomplish this result by increasing the radius of this portion of the rocker shaft that engages the car body and cutting away the lower portions of the shafts, in order that this increased radius of the shaft may not necessitate an increase in the vertical dimension of the openings through which the shaft passes.

By means of my present invention, I also provide an improved agency for promoting the return of the rockers to their normal vertical positions, when said rockers are free of riding engagement with the car trucks, which feature of my invention resides in cam mechanism, one element of which is a part of the shaft construction and another element of which is a part of the bearing for the shaft, these two cam elements being brought into coöperative relation when the rocker is rotated to either of its alternate positions, whereupon said cam elements may coöperate to return the rocker to normal when said rocker is free of riding engagement with the truck.

I will explain my invention more fully by reference to the accompanying drawings, showing the preferred embodiment thereof, in which—

Figure 1 is a cross-sectional view of so much of a car body, its bolster, the truck bolster, and parts associated therewith, as to show one embodiment of the invention. Fig. 2 is a plan view of a side bearing taken just above the plane of attachment of the side bearing with the body bolster. Fig. 3 is a bottom view of the structure shown in Fig. 2. Fig. 4 is a view from beneath showing that plate which is attached to the car body or body bolster for support above a rocker shaft and another plate to coöperate with it in supporting said shaft. Fig. 5 is a view in the direction of arrow 5 of Fig. 4. Fig. 6 is a view in the direction of arrow 6 of Fig. 4. Fig. 7 is a top view of the additional plate which is shown assembled in Fig. 3. Fig. 8 is a side view thereof. Fig. 9 shows a side elevation of the structure with all of the parts assembled as it will appear in its normal vertical position that it occupies when the rocker is free of riding engagement. Fig. 10 is a view taken in a direction at right-angles to that in which Fig. 9 is taken. Fig. 11 is a view similar to Fig. 9, with the exception that the rocker is shown moved to one of its alternative positions. Fig. 12 is a perspective view of the rocker. Fig. 13 is a view similar to Fig. 9 showing the construction, however, slightly modified.

Like parts are indicated by similar characters of reference throughout the different figures.

Inasmuch as the side bearings are generally immediately associated with the body bolsters and truck bolsters, the following description will be had with reference to such an arrangement, though I do not wish to be limited thereto.

In Fig. 1 I have indicated a portion of a car body $a$ of any suitable construction, one of its body bolsters $b$ being attached thereto beneath the same, and having pivotal mounting at $c$ with the truck bolster $d$, in accordance with any suitable practice.

Near the sides of the car and underneath the bolsters $b$ there are provided in the ends of said bolsters my improved side bearings $e$, that include rockers $f$ adapted to ride upon plates $g$ carried by the truck bolster $d$ when the car body is tilted with respect to the truck bolster, one rocker $f$ or the other being engaged with the truck bolster, according to the direction in which the car body slants. The rockers $f$ are desirably normally separated from engagement with the truck bolster. The rockers $f$ are provided with shafts $h$ that are mounted between plates $i$, $k$, the plates $i$ being secured directly to the bottom of the bolster $b$, while the plates $k$ are secured to the plates $i$. The plates $i$, $k$ are separately made, in order that the rockers $f$ may be disposed between the same in assembly, the shafts $h$ being desirably integrally formed with said rockers. In the assembly of the parts, the ends of the shafts are projected through openings $l$, $m$ in the plates, margins of said openings affording means whereby the rockers are given swinging mounting. The segmental or riding surfaces $n$ of the rockers are given a length that will suit the maximum swing of the truck bolsters that is likely to occur. The flat sides $o$ of the rockers are adapted to limit the extent to which said rockers may be swung, these flat sides serving to engage the plates $i$ when the rockers are moved excessively, as is shown in Fig. 11. The axis of rotation of each shaft $h$ desirably shifts as the rocker is rolled, whereby I am enabled to provide improved means for enabling the rocker to return to normal or central position when said rocker is free from the truck bolster, and whereby the range of travel of the rocker is increased. The shifting of this axis is permitted by horizontally elongated openings $l$, $m$ into which the shaft ends project.

It will be seen that the riding surface of the shaft $h$ is of such a radius or curvature that if it were continued completely around the shaft, it would necessitate a lowering of the lower horizontal margins of the openings through which said shaft projects, but as I trim off or shorten the height of the shaft by the constructions illustrated in Figs. 9 to 13, inclusive, the vertical dimension of the openings through which the shaft projects may remain unaltered, while the riding surface of the upper portion of the shaft and the corresponding portion of the rocker may be considerably increased, with an advantage that is apparent.

In short, I have provided a construction comprising a car body having side bearings in the form of rockers depending therefrom and carried thereby, said rockers having shafts and bearings for the shafts carried by the car body, said bearings being provided with horizontally elongated openings into which said shafts project, the upper portions of said shafts being adapted to have riding engagement with the upper horizontal margins of said openings, the portions of the shafts that engage said upper horizontal margins of said openings and the upper riding portions of the rockers being further removed from the axes of rotation of the shafts than the lower portions of the shafts, whereby the shafts and the said riding portions of the rockers may have a greater range of riding engagement for a given vertical dimension of said openings.

In the construction shown in Figs. 9 to 12, inclusive, one sort of a cam formation is illustrated, in the formation of which the shaft is continued slightly below its axis.

In the construction shown in Fig. 13 the cam construction is such that the shaft need not be continued below its axis.

In either case there are two cam formations $p$, $p$ which are normally out of action but which are brought into coöperative relation with the companion elements $q$, $q$ provided on the vertical margins of the openings $l$ and $m$ when the rocker is moved out of the normal position. One cam element $p$ coöperates with one cam element $q$ when the rocker is moved in one direction, and the other cam element $p$ is brought into coöperative relation with the corresponding cam element $q$ when the rocker is moved in an alternate direction, portions $p$ $q$ when in engagement having a shifting fulcrum action, the movable cam portion riding upon the stationary portion in the restoring movement. Whether the rocker travels much or little upon the truck bolster, the cam construction is in position to restore the rocker to its normal or central position when the truck bolster is freed from the rocker. There is thus provided cam mechanism upon the ends of the rockers for the purpose of restoring the rockers.

In order that there may be the requisite freedom of movement of the shaft $h$ within the openings $l$, $m$ corresponding thereto, said openings are made a trifle larger vertically than the engaging portions of the shaft.

Having thus described my invention, I claim as new and desire to secure by Letters-Patent:—

1. The combination with a car body, of side bearings in the form of rockers depending therefrom and carried thereby, said rockers having shafts and bearings for the shafts carried by the car body, said bearings being provided with horizontally elongated openings into which said shafts project, the portions of the rockers upon which the car body is adapted to rest having curvature of larger radius than the distance between the axes of rotation of the rockers and the lower horizontal margins of the said openings.

2. The combination with a car body, of side bearings in the form of rockers depending therefrom and carried thereby, said rockers having shafts and bearings for the shafts carried by the car body, said bearings being provided with openings into which said shafts project, the portions of the rockers upon which the car body is adapted to rest having curvature of larger radius than the distance between the axes of rotation of the rockers and the lower margins of the said openings.

3. The combination with a car body, of side bearings in the form of rockers depending therefrom and carried thereby, said rockers having shafts and bearings for the shafts carried by the car body, said bearings being provided with horizontally elongated openings into which said shafts project, the upper portions of said shafts being adapted to have riding engagement with the upper horizontal margins of said openings, the portions of the shafts that engage said upper horizontal margins of said openings being further removed from the axes of rotation of the shafts than the lower portions of the shafts, whereby the shafts may have a greater range of riding engagement for a given vertical dimension of said openings.

4. The combination with a car body, of side bearings in the form of rockers depending therefrom and carried thereby, said rockers having shafts and bearings for the shafts carried by the car body, said bearings being provided with openings into which said shafts project, the upper portions of said shafts being adapted to have riding engagement with the upper margins of said openings, the portions of the shafts that engage said upper margins of said openings being further removed from the axes of rotation of the shafts than the lower portions of the shafts, whereby the shafts may have a greater range of riding engagement for a given vertical dimension of said openings.

5. The combination with a car body, of side bearings in the form of rockers depending therefrom and carried thereby, each rocker being provided with a cam formation upon its end, and an element coöperating with said cam formation for returning the rocker to its normal position when free of riding engagement.

6. The combination with a car body, of side bearings in the form of rockers depending therefrom and carried thereby, each rocker being provided with a cam formation upon its end, a shaft for each rocker, and bearings for the rockers into which the shafts thereof project, said bearings having cam formations coöperating with the cam formations upon ends of the rockers to return the rockers to normal position when free of riding engagement.

7. The combination with a car body, of side bearings in the form of rockers depending therefrom and carried thereby, a shaft for each rocker having cam formation, and bearings for the rocker shafts into which the shafts thereof project, said bearings having cam formations coöperating with the cam formations upon the rocker shafts to return the rockers to normal when free of riding engagement.

In witness whereof, I hereunto subscribe my name this second day of July A. D., 1906.

JAMES R. CARDWELL.

Witnesses:
 WEBB G. KRAUSER,
 G. L. CRAGG.